United States Patent [19]

Bardin et al.

[11] Patent Number: 4,825,747
[45] Date of Patent: May 2, 1989

[54] METHOD AND DEVICE FOR DETECTING A FLUID FLOW RATE

[75] Inventors: Christian Bardin, Bois Colombes; Pierre Morin, Levallois-Perret, both of France

[73] Assignee: Institut Francais du Petrole, Rueil-Malmaison, France

[21] Appl. No.: 866,922

[22] Filed: May 27, 1986

[30] Foreign Application Priority Data

Jun. 11, 1985 [FR] France ............... 85 08936

[51] Int. Cl.$^4$ .................. G01F 1/38; F01B 1/00
[52] U.S. Cl. .................. 91/165; 73/861.47; 73/861.53
[58] Field of Search ......... 73/730, 861.47, 861.48, 73/861.63, 861.64; 340/606; 138/43, 45; 137/502, 124; 91/165

[56] References Cited

U.S. PATENT DOCUMENTS

| | | | |
|---|---|---|---|
| 1,652,941 | 12/1927 | Isaac | 73/861.47 |
| 2,017,311 | 10/1935 | Jacobson | 137/502 |
| 2,240,119 | 4/1941 | Montgomery et al. | 73/861.63 |
| 2,918,933 | 12/1959 | Boitnott | 251/124 X |
| 3,130,586 | 4/1964 | Taylor et al. | 73/730 |
| 3,178,942 | 4/1965 | Bendy | 73/861.64 |
| 3,182,501 | 5/1965 | Haase | 73/861.53 |
| 3,678,754 | 6/1972 | Amir et al. | 73/861.47 |
| 3,910,112 | 10/1975 | Gerlach | 73/861.53 |
| 4,484,479 | 11/1984 | Eckhardt | 73/861.47 |

Primary Examiner—Herbert Goldstein
Attorney, Agent, or Firm—Antonelli, Terry & Wands

[57] ABSTRACT

A method and device are provided for detecting a fluid flow rate, said device comprising a body in which is formed a passage for the fluid, said passage comprising at least two cross sections of different values, a piston having two faces cooperating with the housing, said piston defining with said housing two zones situated on each side of the two faces of said piston, means for returning said piston to a first position or rest position, each of said zones being substantially at the same pressure as said passage at the level of one of the two cross sections.

14 Claims, 6 Drawing Sheets

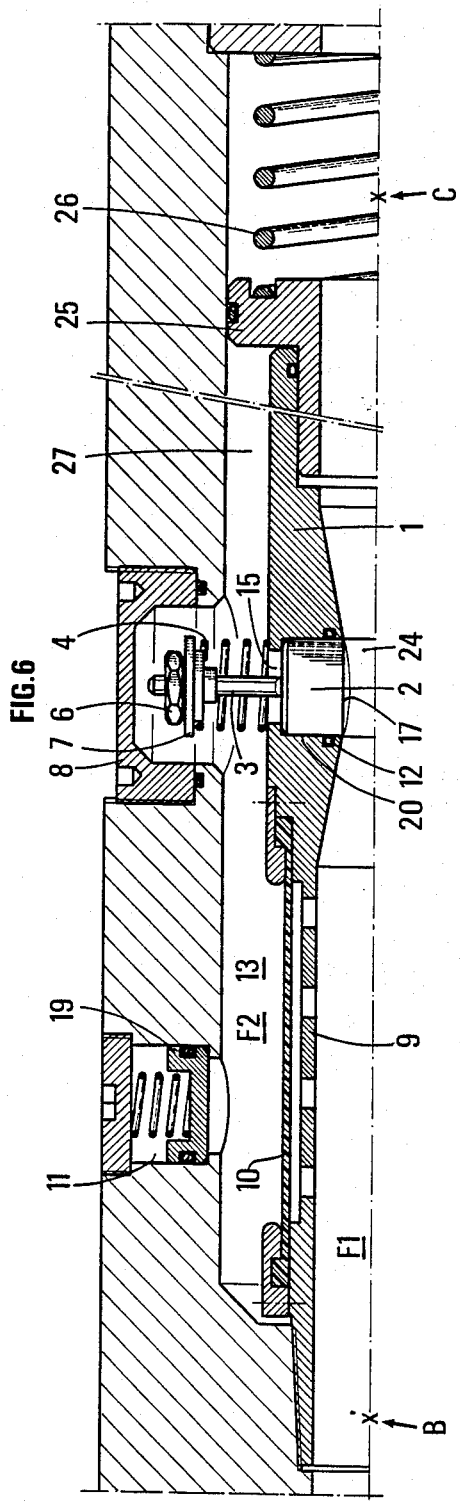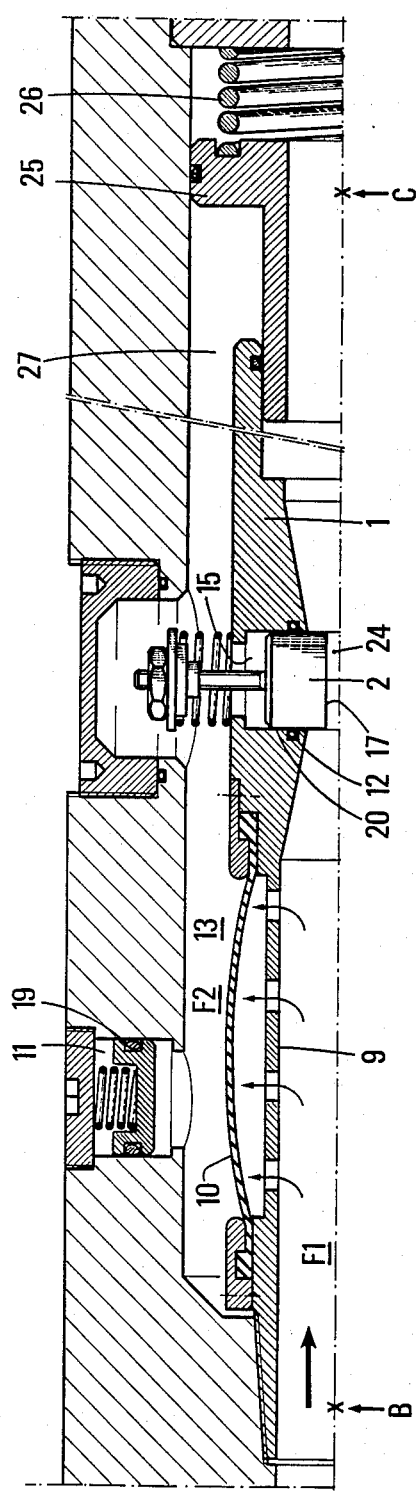

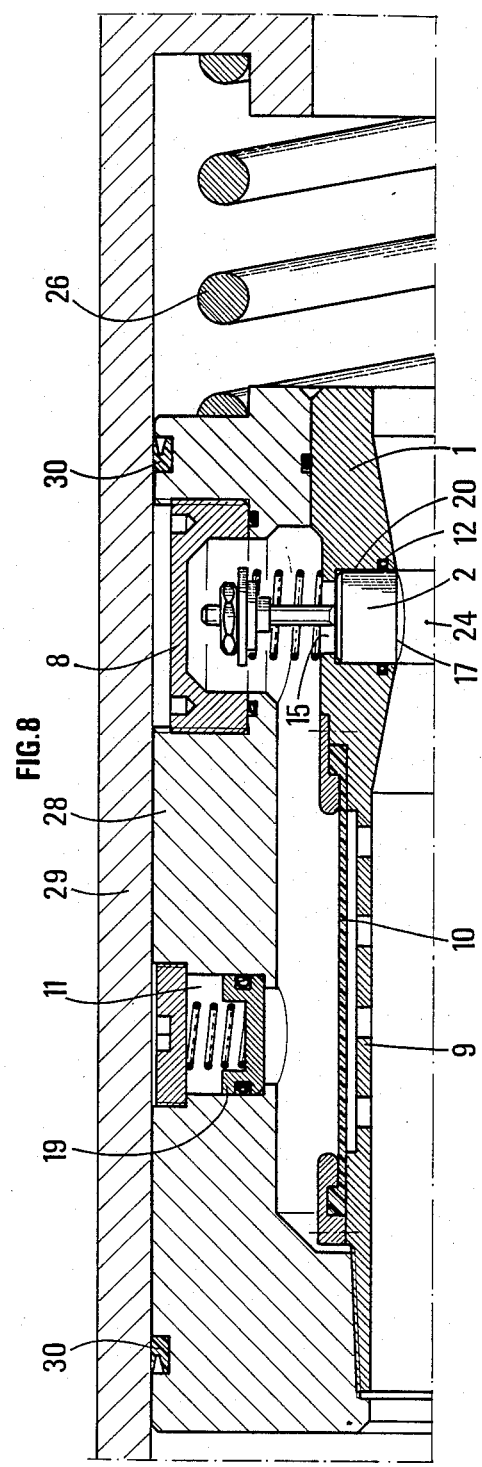

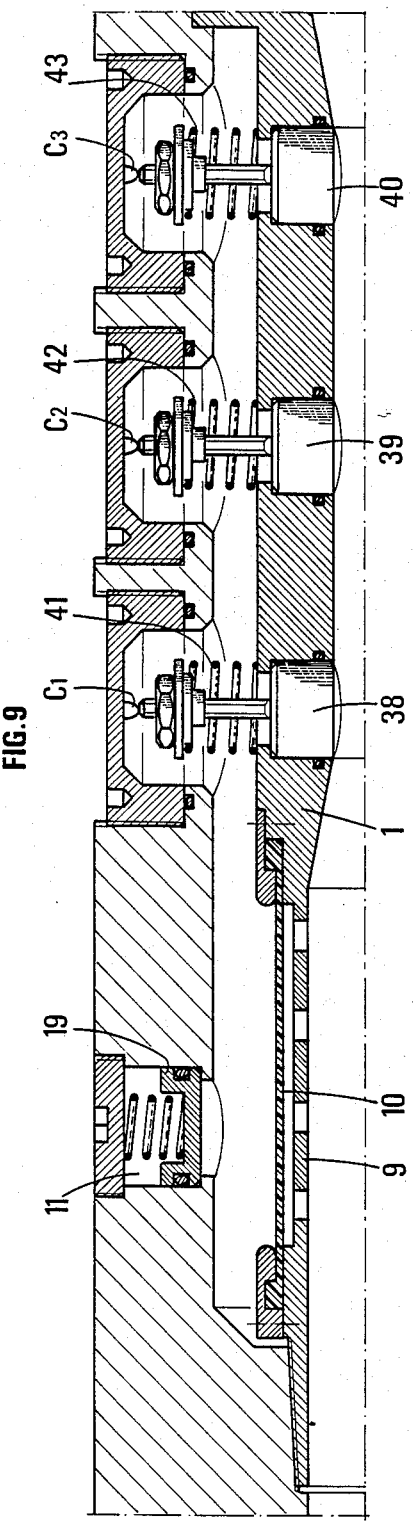
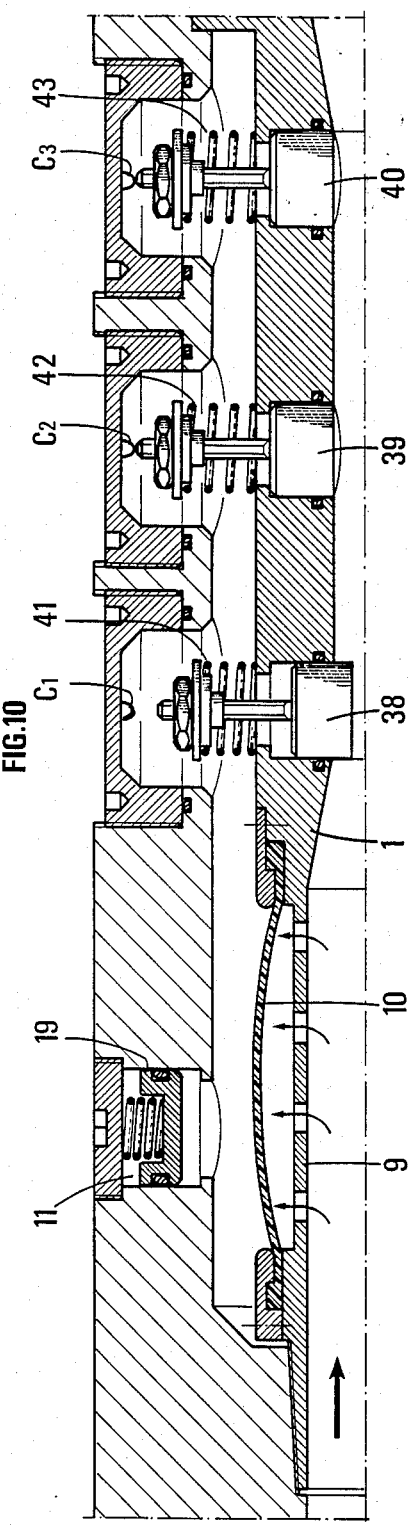

METHOD AND DEVICE FOR DETECTING A FLUID FLOW RATE

BACKGROUND OF THE INVENTION

1. Field of the Invention

The present invention relates to a device and method for detecting a rate of flow especially in the field of oil drilling and more particularly in the field of operations during drilling. In fact, during such operations, it is often necessary to transmit information from the surface to the well bottom, more particularly for actuating or stopping a mechanism.

2. Description of the Prior Art

Conventional techniques make use of an electric cable or send a ball from the surface. The first technique has the major drawback of having an application limited to turbo drilling, for rotation of the string comprising a cable is impossible or at least requires costly adaptation of the drill stem. The use of a ball released in the drill stems interferes little with the use of the drill stems, but some measuring instruments used during drilling, as well as the hole bottom motors and turbines, do not allow this ball to pass.

The prior art may be illustrated by the following documents U.S. Pat. No. 1,635,040, U.S. Pat. No. 3,717,208, DE-A-2 643 996.

SUMMARY OF THE INVENTION

The present invention provides then a hole bottom sensor sensitive to one or more flow rate thresholds. This bottom sensor allows then one or more signals or information to be detected sent from the surface in the form of a correct adjustment of the rate of flow of the drilling fluid passing through this sensor.

This sensor may in addition create an over pressure upstream of the device, which may be used for operating different mechanisms.

The device of the invention comprises a body in which is formed a passage for the fluid to be detected, a piston which may be termed detector piston having two faces cooperating with a housing, said piston defining with said housing two zones spaced apart on each side of the two faces of said piston, means for returning said piston to a first or rest position.

The passage itself comprises at least two cross sections of different values.

Each of the zones is substantially at the same pressure as the passage at the level of one of the cross sections; that is each of the zones is, respectively, substantially at the same pressure as that in the passage at each one of the different cross sections. The passage may have the form of a venturi, that is it may comprise a narrowed portion followed by a widened portion.

The piston may have a stroke sufficient for closing at least partially during its movement the passage through which the fluid flows.

The housing of the piston may have a cylindrical shape and its access may be substantially perpendicular to the flow direction of the fluid in the passage.

One of said zones, discussed above, may be in communication with the smallest value section.

The device of the invention may comprise several pistons, each of these pistons comprising return means which are proper thereto.

At least one of the zones defined by the piston may communicate with one of the passage cross sections through a mobile or deformable wall.

The device of the invention may comprise a system for detecting the movement of the piston.

The device of the invention may comprise an auxiliary piston itself defining two zones one of which is substantially at the same pressure as a section of the fluid passage.

The detector piston may have a stroke which is sufficiently long for its movement to cause an increase of pressure for moving the auxiliary piston.

In a variant of the present invention, the auxiliary piston may support the fluid passage and the detector piston.

Still within the scope of the present invention, the device may be equipped with a duct communicating one of the zones defined by the auxiliary piston with one of the zones defined by the detector piston and another duct placing these two zones substantially at the same pressure as the passage of the fluid at the level of a cross section situated upstream of said detector piston, considering the flow direction.

The present invention also provides a method for detecting at least one threshold flow rate of a fluid and for controlling an action from this flow rate. In this method, said fluid is caused to flow through a passage having at least two diffrent cross sections and from a threshold flow rate said passage is at least partially closed so as to cause a pressure drop of said fluid and the pressure difference existing on each side of said obstruction is used for controlling an action.

BRIEF DESCRIPTION OF THE DRAWINGS

The invention is illustrated, solely by way of example, by the accompanying drawings in which:

FIGS. 6, 7, 8, 9, 10 and 11 show improvements to the system of the invention as well as different applications.

DESCRIPTION OF THE PREFERRED EMBODIMENTS

Figure 1:
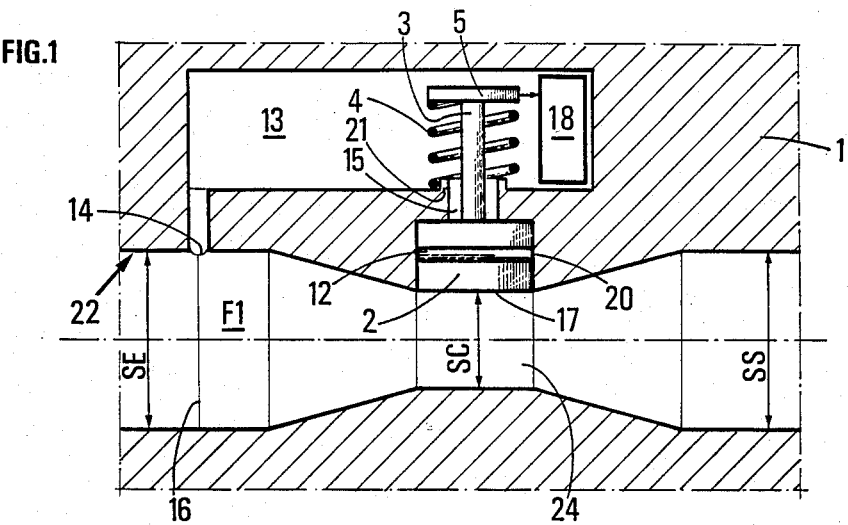
FIGS. 1 and 2 show schematically a simple embodiment of the device of the invention, FIG. 3 gives the characteristic curve of the evolution of the pressure difference in a fixed device as a function of the flow rate.

FIG. 1 shows schematically one embodiment of the device of the invention.

This device comprises:

a restriction followed by a widening of the section of the fluid passage of venturi 1 in which is formed at least one bore along an axis substantially perpendicular to the flow direction of the fluid through the venturi. This bore opens into the venturi at a level where the cross section of the fluid passage SC is less than the cross section of the fluid passage at the inlet SE or at the outlet SS of the venturi. This section SC will be preferably the smallest fluid passage section of the venturi, but it may be otherwise. In the case of FIG. 1, there exists a zone of constant section between the restriction and the widened portion;

a piston 2 preferably cylindrical which cooperates with a bore 20, this piston 2 has two faces referenced 17 and 23 and defines two zones referenced 24 and 15;

a system 12 for sealing between piston 2 and bore 20 such as an O-seal;

a system for returning the piston to its housing exerting a return force F opposing extension of the piston. This return system comprises a rod 3 integral with the piston 2, a washer 5 integral with rod 3 and a spring 4 positioned between the washer 5 and a shoulder 21 forming part of the venturi 1. Spring 4, once in position, is compressed so as to exert on piston 2 a force F which tends to maintain this piston against the shoulder 21;

if required, a system 18 may be provided for detecting the movement of the piston. This system may be mechanical such as a lever, electrical such as a contact, a switch, hydraulic such as a distibutor, pneumatic, magnetic, electronic or of any other type;

a communication comprising a duct 13 formed for example in the body of the venturi, if this latter is formed of a solid piece opening into the fluid flow channel in a direction substantially perpendicular to the flow direction of the fluid at a level where the section of the fluid passage is greater than the section SC in line with the piston. This duct 13 allows the static pressure of the flow in section 16 to be transferred to the "rear" face 23 of piston 2. As a general rule, the fluid acting on face 23 of the piston may be identical to that which flows through the venturi. However, for reasons of durability and reliability of the installation, it may be desirable to use different fluids.

One embodiment of the invention, taking this point into account, will be described with reference to the diagram of FIG. 6 and further on.

When a fluid flows through the venturi 1, the static pressures in the different sections of the venturi take on different values. It is possible to evaluate the pressure difference between two sections S1 and S2 using the following theorem of Bernoulli applied to an incompressible fluid:

$$P_{S1}+\tfrac{1}{2}RV^2_1+Rgz_{S1}=P_{S2}+\tfrac{1}{2}RV^2_{S2}+Rgz_{S2}+DH_{12} \qquad (I)$$

where $P_{S1}$ and $P_{S2}$ are the values of the static pressures respectively at a level of sections S1 and S2, $V_{S1}$ and $V_{S2}$ are the values of the flow rates of the flow speeds of the fluid respectively in sections S1 and S2, $z_{S1}$ and $z_{S2}$ are the values of the respective altitudes of sections S1 and S2 with respect to a fixed reference, R is the value of the voluminal mass of the fluid, g is the acceleration due to the forces of weightlessness, $DH_{12}$ is the pressure drop of the flow between sections S1 and S2.

For the sake of simplicity, and for clarifying this description, we may consider that the term $(Rg(z_{S1}-z_{S2}))$ is small with respect to the term $\tfrac{1}{2}R(V^2_{S1}-V^2_{S2}))$ and the term $DH_{12}$ small with respect to the term $(P_{S1}-P_{S2})$.

This will be more particularly justified if duct 13 opens into a section situated upstream of the narrowed section of the venturi for a convergent creates little pressure drop.

Bernoulli's equation (1) then becomes $$P_{S2}-P_{S1}=\tfrac{1}{2}R(V^2_{S1}-V^2_{S2}) \qquad (II)$$

If Q is the voluminal flow rate of the fluid, equation II may be written $$P_{S2} - P_{S1} = \tfrac{1}{2} R \left( \frac{1}{S_1^2} - \frac{1}{S_2^2} \right) Q^2 \qquad (III)$$

S1, S2 being constants for given equipment III may be written $$P_{S2}-P_{S1}=ARQ^2 \qquad (IV)$$

where $$A = \tfrac{1}{2} \left( \frac{1}{S_1^2} - \frac{1}{S_2^2} \right)$$

is a constant.

It is clear from equation IV that, for a given fluid, so for a fixed voluminal mass, the pressure difference $P_{S2}-P_{S1}$ only varies as a function of the square of the flow rate Q.

When the flow rate reaches a certain value, called activation flow rate Qact, the pressure difference $DP=P_{S2}-P_{S1}$ exerted on the section s of piston 2 creates a force $f=DP\times s$ sufficient for overcoming the return force F increased by the frictional force due to the sealing system 12.

At that moment, the piston will leave its housing until a new balance of forces is found, either by increasing the return force, or by action of a mechanical stop at the level of the moving parts (piston, rod, washer . . . ).

Figure 2:
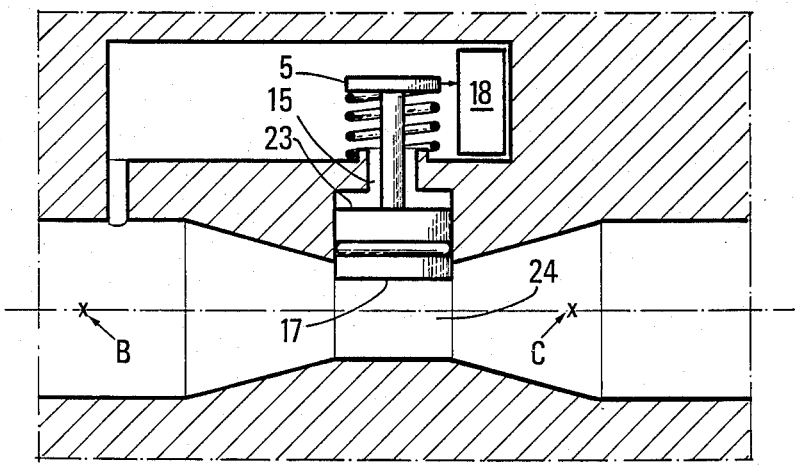

This new balance is shown in the diagram of FIG. 2. During movement of the piston, system 18 detects this information which is the direct representation of the product of the voluminal mass of fluid R multiplied by the square of the flow rate $Q:RQ^2$.

Figure 3:
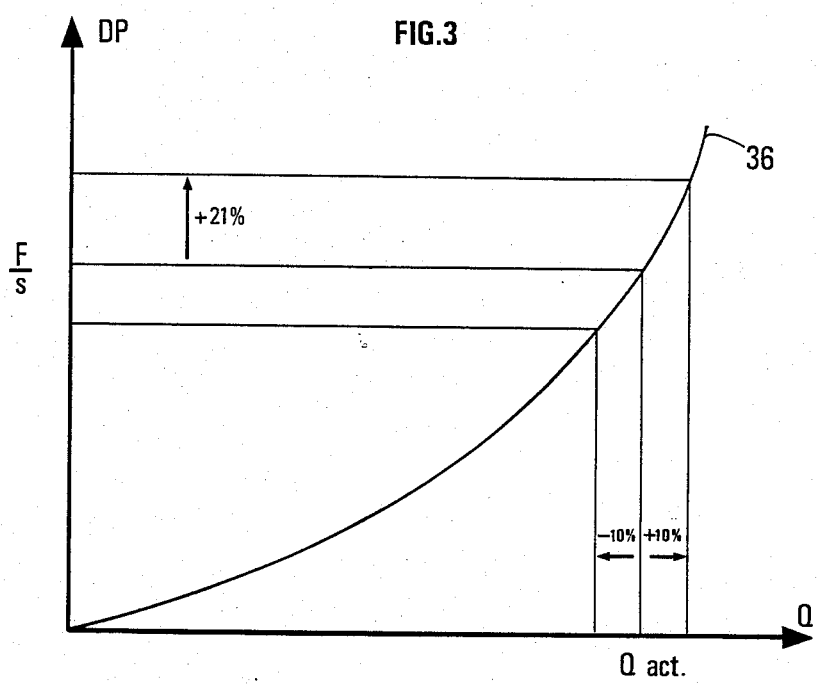

The curve of FIG. 3 shows the evolution of the pressure difference DP as a function of the flow rate Q for a given fluid (so R constant). When the flow rate reaches the activation flow rate value Qact, the pressure difference DP is equal to the return force F divided by the section s of piston 2. The curve 36 of FIG. 3 shows a well known aspect of the venturi system which is its high accuracy for forming a flow rate detector. In fact, since the pressure difference DP varies as a function of the square of the flow rate, a small variation of this latter creates a substantial variation of the pressure difference DP. For example, a variation of 10% of the flow rate will create a variation close to 20% of the pressure difference DP and a variation of 20% of the flow rate will create a variation close to 44% of the pressure difference DP.

The system of the invention combines then the accuracy of the venturi system, the robustness, reliability and moderate cost of a mechanical system particularly well adapted to hostile environments where a high pressure, a high temperature, etc . . . reign.

The system of the invention offers a great possibility of adjusting the flow rate threshold at which it is desirable to have movement of the piston. In fact, for a given fluid, the activation flow rate will depend on the section of the fluid passage opposite the piston, on the section of the fluid passage at the level where the tapping or orifice 14 of the end of duct 13 emerges, on the section of piston s and on the return force F.

These three sections are manufacturing data and are therefore unchangeable once the system has been constructed. On the other hand, the return force F may possibly be modified (change of spring for example or modification of its initial compression . . . ), which gives an advantageous flexibility adjustment to the system of the invention.

The system of the invention may comprise several identical or different pistons of section s. The section of these pistons as well as the mechanical characteristics of the return means are determined for detecting identical or different flow rates. Thus flow rate ranges may be detected and for example it is possible to know that the rate of flow passing at a given moment through the system of the invention is between two thresholds $Q_1$ and $Q_2$, below or above these threshold flow rates, depending on whether the piston detecting flow rate $Q_1$ has moved and the piston detecting flow rate $Q_2$ has not moved, whether the two pistons have moved or have not moved.

The system of the invention may also serve as voluminal mass detector by being placed in a duct where the rate of flow of the flud will be kept constant.

It will then be possible to adjust the return means so that movement of the piston occurs for a given voluminal mass R.

The system of the invention will be less accurate when used for voluminal mass detection than for flow rate detection, for the pressure difference depends on the voluminal mass raised to the power A only.

Figure 4:
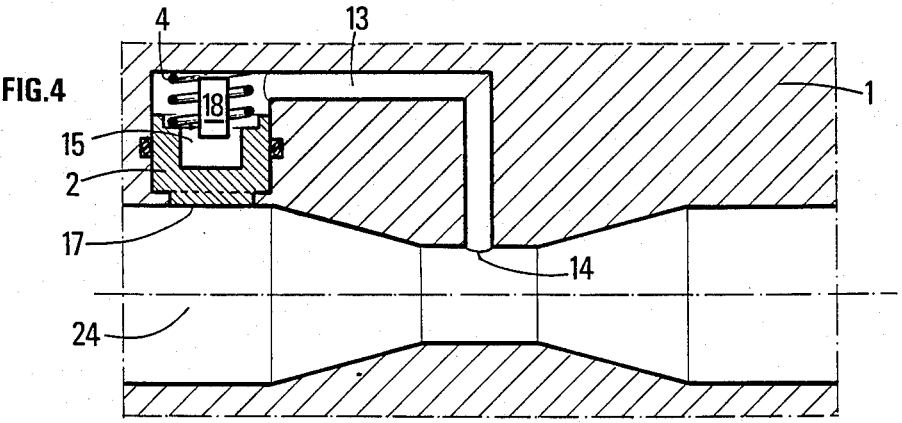
FIG. 4 illustrates another embodiment of the invention.

A variant of the system of the invention consists, as shown in FIG. 4, in positioning piston 2 at the level of a fluid passage section greater than the section at the level of which is formed the pressure tapping I4 acting via duct 13 behind piston 2.

In this case, the movement of piston 2 and the action of spring 4 will be reversed with respect to the system shown in FIG. 1.

It will still be possible to adapt a detection system 18 sensing the movement of piston 2.

The diagram of FIG. 2 shows piston 2 in a position in which it has left its housing and closes off a part of the fluid passage section. It is possible to arrange for the piston not to close off the cross section of the fluid passage, even partially, by positioning at the outset set back in its housing (or by using the variant shown in FIG. 4).

However, the possibility of partial obstruction of the fluid flow channel is an advantage of the system of the invention.

In fact, it allows an information detector, in this case a flow rate threshold detector, and a system capable of making available a certain drive power for operating equipment, such as a piston for example, to be combined in a single assembly.

In fact, when the piston or pistons 2 obstruct the flow passage or channel 22 of fluid F1, they create between the upstream part and the downstream part of the venturi a pressure drop DT which corresponds to a degradation of the total energy of the fluid in the form of heat.

Considering the two points B and C situated respectively upstream and downstream of the system of the invention (FIG. 2) the degradation of energy will result in a pressure difference dP, an approximate value of which is given by the equation V hereafter:

$$dP = \tfrac{1}{2}R(V_1-V_2)^2 = P_B - P_C \qquad (V)$$

Where
R is the voluminal mass of fluid,
$V_1$ the flow speed of the fluid in the obstructed section,
$V_2$ the flow speed of the fluid at C,
$P_B$ the total pressure at B, and
$P_C$ the total pressure at C.

This pressure difference may be measured and compared with the calculated value if the fluid passage sections B and C are identical. If the fluid passage sections at B and C are different, the pressure measurement will simultaneously reflect the pressure loss created and the kinetic energy variation $\tfrac{1}{2}RV^2$ between points B and C.

Figure 5:
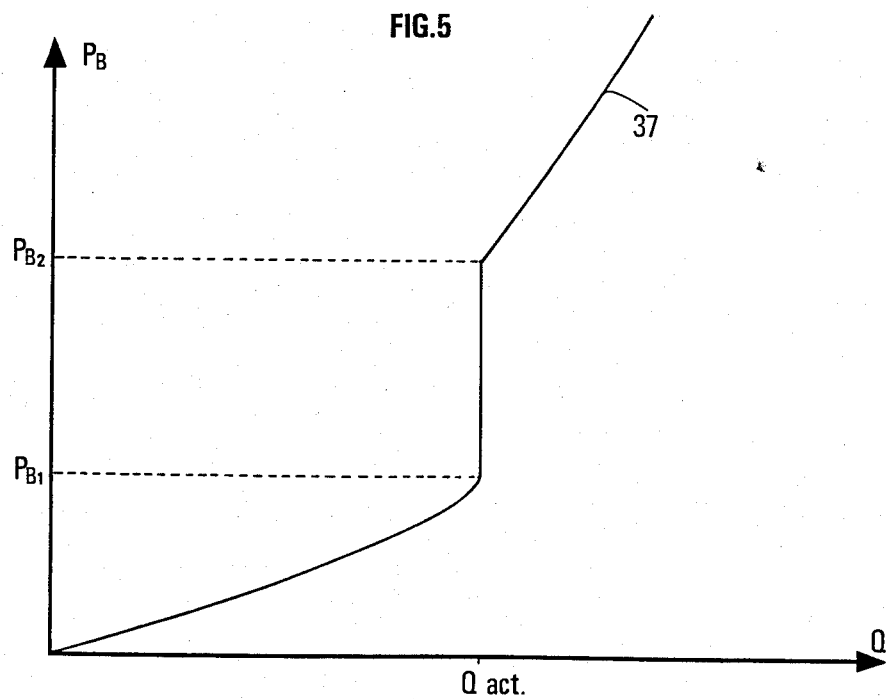
FIG. 5 shows the curve of evolution of the pressure upstream of the system of the invention in a given case.

The curve 37 of FIG. 5 shows the evolution of the pressure upstream of the system of the invention in the case of partial obstruction of the flow by a piston 2.

When the flow rate remains less than the activation flow rate Qact, the pressure varies as a function of the square of the flow rate. When the activation flow rate is reached, the extension of piston 2 creates a sudden increase of the pressure at B shown on curve 37 by the segment PB1—PB2. For higher flow rates, the pressur at B varies again as a function of the square of the flow rate Q.

The sudden pressure variation PB2—PB1 when the piston 2 extends allow the correct operation of the device of the invention to be checked remotely by means of a pressure measurement.

With the variant shown in FIG. 6, the over pressure created by the extension of the piston or pistons into fluid F1 upstream of this piston 2 is used for moving a member. In addition, the variant shown in FIG. 6 may be used with a fluid F1 transporting impurities since there is separation of fluid F1 and of the fluid used for moving said member as will be explained further on.

The system shown in this FIG. 6 comprises no detection system 18 associated with the movement of the piston but this possibility is not excluded. In the event shown, there exists a possibility of adjusting the detection threshold by adjusting the initial value of the return force F through the nut 6 and washer 7. This nut is accessible through the opening 8.

The communication 13 filled with a fluid F2, which may be hydraulic oil for example, plays the role of reservoir for this fluid F2 which is used for operating a mechanism or an associated member during extension of piston 2. It would be possible to use different independent communications 13 for operating different mechanisms.

Communication 13 will then be in relation with a part of the fluid flow channel 22 situated upstream of the venturi. The physical separation between fluids F1 and F2 will be provided by a flexible membrane 10 which may itself be protected from the effects of erosion of fluid F1 by a piece 9, made from metal or not, which is perforated for transferring the pressure fluid F1 to fluid F2.

Piece 9 will also prevent deformation of membrane 10 towards the inside of the fluid flow channel 22, which would cause an unforeseen obstruction of this channel. Of course, this membrane may be replaced by another member, particularly by a piston.

In the circuit of fluid F2, there may be provided a compensation chamber 11 the essential purpose of which will be to compensate for the expansion of fluid F2 under the effect of heat and thus to avoid an unexpected increase of the pressure of fluid F2 which would modify the operation of the system.

FIG. 7 shows the operation of the improved system of the invention when the flow rate passing through venturi 1 is greater than or equal to the preadjusted activation flow rate. Under the effect of the pressure difference, piston 2 leaves its housing and partially obstructs the fluid flow channel. The movement of the piston requires a transfer of a certain volume V of fluid F2 from chamber 13 to the space or zone 15 defined by the face 23 of the piston and bore 20.

This transfer is possible because of the deformation of membrane 10 which allows the total volume of fluid F2 to be kept constant and because of the transfer of the same volume V of fluid F1 through piece 9.

In FIGS. 6 and 7, fluid F2 serves for moving an auxiliary piston 25 which is annular and compresses a spring 26.

The operation of this system is:

When the fluid flow rate reaches a threshold flow rate called activation flow rate, piston 2 paritally obstructs the flow channel 22 of fluid F1 and creates between the points B and C a pressure drop which will result in a substantial pressure difference between B and C: $P_B - P_C > 0$.

By dimensioning the system so that the pressure difference $P_B - P_C$ multiplied by the active section SP of the auxiliary piston 25 represents a force greater than that of spring 26, then the pressurized fluid F2 coming from chamber 13 and passing through duct 27 may move piston 25 and compress the spring 26, which is the case shown in FIG. 7.

The volume of fluid F2 required for moving piston 25 will then be taken, as shown in FIG. 7, from the initial volume of chamber 13 through deformation of membrane 10 and transfer of an equivalent volume of fluid F1 through piece 9. It should be noted that the system would also operate if the fluids F1 and F2 were identical and so without membrane 10 or piece 9 as well as in the absence of the compensation chamber 11.

The movement of piston 25 creating compression of spring 26 may be considered as storage of a certain amount of energy which may be used subsequently.

The return of the system to the initial position, shown in FIG. 6, is provided by lowering the flow rate of fluid F1 until the pressure at B drops sufficiently for allowing piston 2 and/or piston 25 to return. It should be noted that the return of pistons 2 and 25 may be synchronized or not.

The use of the system of the invention for moving a piston from a given flow rate may be envisaged by integrating the flow rate detection and energy degradation system in the mobile auxiliary piston and using for example fluid F1 directly as fluid for driving the piston.

A schematical representation of such a system is shown in FIG. 8. Reference numeral 28 designates the mobile auxiliary piston and 29 designates the outer body of the system. Spring 26 opposes movement of piston 28. Lipped seals 30 may be used for providing sealing between the mobile auxiliary piston and the outer body 29.

Of course, membrane 10, grid 9 and the compensation chamber 11 of the device shown in FIG. 8 may be omitted without departing from the scope of the invention.

The operation of this embodiment is given hereafter.

From a certain flow rate called activation flow rate, the piston 2 leaves its housing and causes a pressure drop which results in the movement of the auxiliary piston 28 and compression of spring 26.

Of course, in the embodiment shown in FIG. 8 the auxiliary piston it its travel drives piston 2, which is not the case of the embodiment shown in FIGS. 6 and 7.

In addition, in the embodiment of FIG. 8, the volume displaced by deformation of membrane 10 corresponds solely to the volume freed by the movement of piston 2 and possibly of piston 19 of the compensation chamber 11.

FIG. 9 shows a possible embodiment of the system of the invention with several pistons "reacting" to different flow rates. In our particular case, there are three pistons 38, 39, 40 with identical sections placed at levels where the fluid passage sections in the flow channel are identical. Springs 41, 42, 43 respectively associated with each of said pistons create a return force on the pistons different from one to the other, so that they will react to different activation flow rates Q1act, Q2act, Q3act. A contact, respectively C1, C2, C3, may be associated with each piston for informing an auxiliary electronic circuit of the movement of the corresponding piston.

Let us suppose that $Q1act < Q2act < Q3act$.

Let us suppose that the flow rate Q passing through the system is such that $Q1act < Q < Q2act$.

The system will then change from the state shown in FIG. 9 to that shown in FIG. 10. Piston 38 will move, which will result in opening contacts C1. Since pistons P2 and P3 are not moved, contacts C2 and C3 will remain closed. These three data may be taken into acount by an associated electronic or electric circuit not shown.

A system comrpsing two pistons 38 and 39 reacting respectively to flow rates Q1act and Q2act and associated respectively with a contact C1 and C2 may be used for starting up and stopping for example a well bottom data recording system. It will be supposed in the rest of the description that Q1act is less than Q2act.

It is easy to construct an electronic circuit controlling the start up of recording when C1 is open and controlling the stopping of the recording when C2 is open. It will then be easy to control the recording periods by adjustment of the flow rate.

The system of the invention may also be applied, for example, to the control of a variable angle elbow joint for directed drill holes such as described in French Pat. Nos. 78/22.063, 79/08.803, 79/08.804, 80/29.890, 82/00.652.

In fact, the operation of the variable angle elbow joint for directed drill holes requires information to be taken into account and a momentary over pressure to be created in a part of the joint for moving a piston.

Through the cooperation between fingers and grooves, the movement of the auxiliary piston causes rotation of the lower part of the elbow joint with respect to the upper part, which rotation, because of the design of the variable angle elbow joint, results in the creation of an angle between the axes of the two above mentioned parts.

The application of the system of the invention is not limited to the single case of the variable angle elbow joint, but finds an advantage in numerous applications, particularly in equipment situated in inaccessible ducts in which an incompressible fluid flows and in the case where transfer of information to this equipment is required and/or in the case where a certain energy is required for operating a mechanism.

Figure 11:
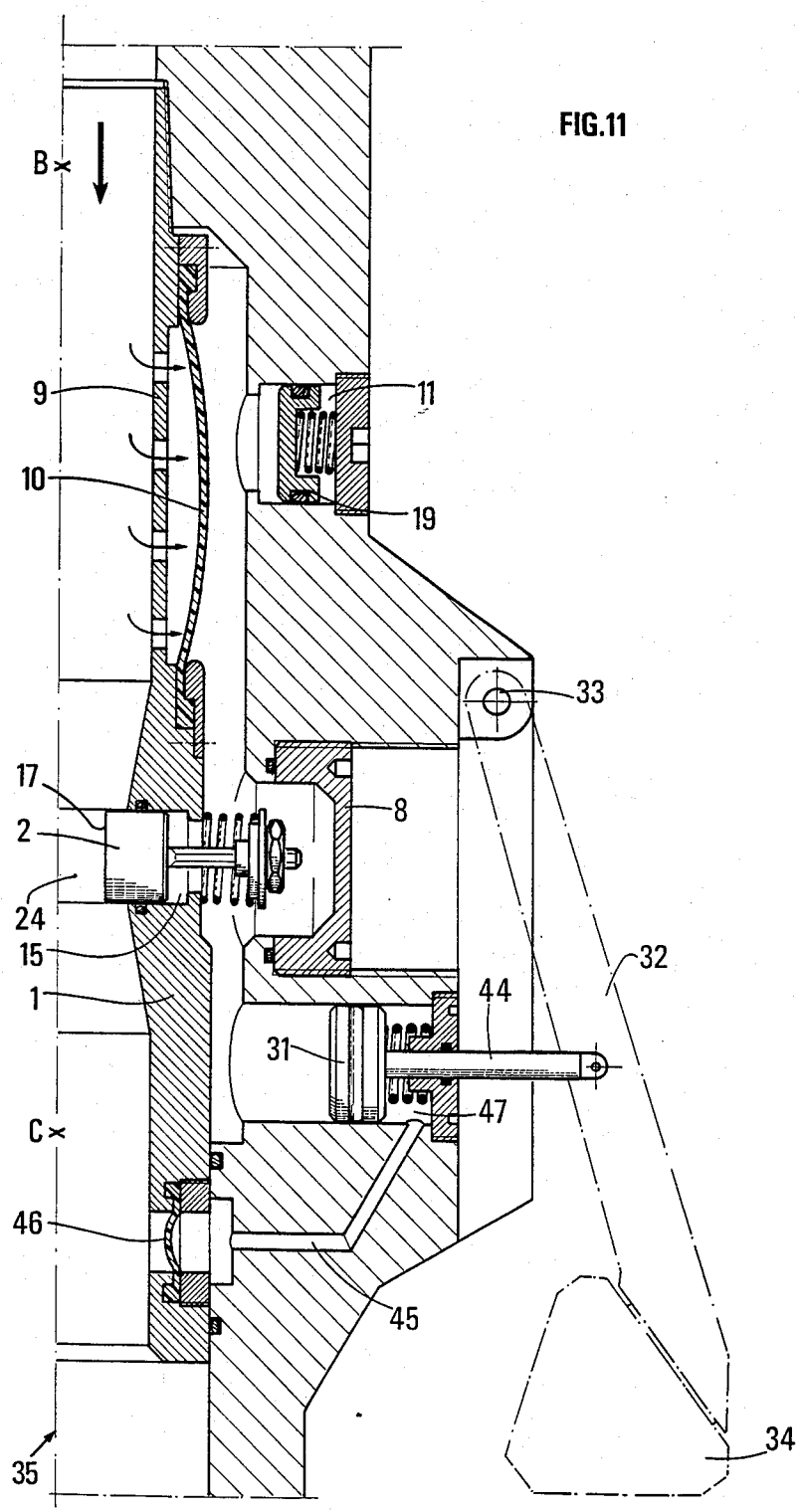

It could be used for example for controlling the spacing apart of the arms of an underreamer used in drilling for increasing the diameter of the well. FIG. 11 shows a possible application of the system of the invention for moving apart the arms 32 of a well underreamer. When the flow rate is higher than the activation flowrate, piston 2 partially obstructs the fluid flow channel, which creates between points B and C a pressure difference DP sufficient for moving a piston 31 connected through a rod 44 to the arm 32 of the underreamer, which causes rotation of the arm of the underreamer 32 about axis 33.

This movement results in moving a cutter wheel 34 away from the axis 35 of the well. Rotation of this assembly results in increasing the diameter of the well. In this configuration, the arm of the underreamer remains in position as long as the fluid flow rate remains fairly high. Mechanical or hydraulic locking of the position of piston 31 or of arm 32 may be provided in this system. It is then possible to control the retraction of this locking system using a flow rate detection system of the invention, this system reacting to a flow rate higher than the initial activational flow rate controlling moving apart of the arms. Duct 45 and membrane 46 permit transfer and storage of the fluid driven out by displacement of piston 31.

What is claimed is:

1. A device for detecting the flow rate of a fluid, comprising a body member in which is formed a passage for the flow of said fluid, said passage comprising at least two cross sections of different sizes, at least one piston having two faces cooperating with a housing adjacent to said passage, said piston defining with said housing two zones situated on either side of the two faces of said piston, return means for returning said piston to a first position within said housing, said return means opposing extension of the piston into said passage, each of said zones being substantially at the same pressure as that in said passage at each one of the two cross sections, respectively, and said piston being directly in contact with the fluid flowing in said passage.

2. The device as claimed in claim 1, wherein said passage is in the form of a venturi and comprises a narrowed portion followed by a widened portion; one of said zones is in communication with the cross section of the passage having the smallest size.

3. The device as claimed in one of claims 1 and 2, wherein said piston has a stroke sufficient for, during its movement, at least partially obstructing the flow passage of the fluid.

4. The device as claimed in claim 1, in which said housing of the piston has a cylindrical shape, wherein the axis of said housing is substantially perpendicular to the direction of the fluid flow through said passage.

5. The device as claimed in claim 1, comprising several pistons, each of said pistons comprising a return means and each of said pistons being arranged in a housing that is arranged perpendicular to the flow direction of fluid within the housing and each piston being in contact with the fluid in one of said at least two cross sections.

6. The device as claimed in claim 1, wherein at least one of said zones communicates with one of said sections through a movable wall.

7. The device as claimed in claim 1, further comprising a system for detecting the movement of said piston.

8. The device as claimed in claim 1, further comprising an auxiliary piston defining two zones, one of which is substantially at the same pressure as a cross section of said passage and the other of which is substantially at a pressure equal to that applied to a rear face of said piston, said piston having a stroke sufficient for, during its movement, at least partially obstructing the flow passage of the fluid.

9. The device as claimed in claim 8, wherein said piston has a sufficiently long stroke so that its movement creates a pressure increase in said passage for moving said auxiliary piston.

10. The device as claimed in claim 8, wherein said auxiliary piston supports said passage and said piston.

11. The device as claimed in claim 8, further comprising a duct connecting one of the zones defined by said auxiliary piston with one of the zones defined by said piston and by another duct placing these two zones substantially at the same pressure as that of said passage at a cross section situated upstream of said piston, considering the direction of the flow of said fluid.

12. A device as claimed in claim 1, wherein said piston has a rear face located in a zone which is subjected to a static pressure of the flow of the fluid within one of the cross sections of said passage.

13. A method for detecting at least a threshold flow rate of a fluid in a passage and for controlling an action of an associated element from this flow rate, wherein said fluid is caused to flow through a passage having at least two different cross sections, a pressure in each of said cross section acting on one of the faces of a piston in direct contact with the fluid upon occurrence of threshold flow rate, obstructing said passage at least partially with said piston to cause a pressure difference between the upstream and downstream sides of the piston with said passage and utilizing the pressure difference for controlling the action of said associated element, via the action of an auxiliary piston, the movement of which is controlled by said pressure difference.

14. A device for detecting the flow rate of a fluid, comprising a body member in which is formed a passage for the flow of said fluid, said passage comprising at least two cross sections of different sizes, at least one piston having two faces cooperating with a housing adjacent to said passage, said piston defining with said housing two zones situated on either side of the two faces of said piston, return means for returning said piston to a first position within said housing, said return means exerting a force opposing extension of said piston into said passage, each of said zones being substantially at the same pressure as that in said passage at each one of the two cross sections, respectively, and said piston being directly in contact with the fluid flowing in said passage and a duct within said body member which is arranged perpendicular to the flow direction of fluid within said passage and which is connected to a zone situated over a rear face of the piston opposite to the face contacting the fluid; said duct allowing transfer of the static pressure of the fluid flow in one of the cross sections of said passage to the rear face of said piston.

* * * * *